(12) United States Patent
Koide

(10) Patent No.: US 6,931,469 B2
(45) Date of Patent: Aug. 16, 2005

(54) 40/80-CORE CABLE DISCRIMINATING METHOD AND SYSTEM PERFORMING EXACT DISCRIMINATION ALTHOUGH MASTER AND SLAVE STORAGE APPARATUSES ARE CONNECTED HOST

(75) Inventor: Keiji Koide, Gunma (JP)

(73) Assignee: NEC Corporation, Tokyo (JP)

( * ) Notice: Subject to any disclaimer, the term of this patent is extended or adjusted under 35 U.S.C. 154(b) by 407 days.

(21) Appl. No.: 10/101,566

(22) Filed: Mar. 20, 2002

(65) Prior Publication Data

US 2002/0156961 A1 Oct. 24, 2002

(30) Foreign Application Priority Data

Mar. 21, 2001 (JP) ........................................ 2001-080666

(51) Int. Cl.⁷ .............................................. G06F 13/00
(52) U.S. Cl. ...................................... 710/104; 713/100
(58) Field of Search ............................. 710/8–10, 104; 713/1–100

(56) References Cited

U.S. PATENT DOCUMENTS 5,928,028 A * 7/1999 Orsley et al. ............... 439/497
5,967,832 A * 10/1999 Ploehn ......................... 439/497
6,223,229 B1 * 4/2001 Kvamme ...................... 710/10
6,523,071 B1 * 2/2003 Klinger et al. ................ 710/10

FOREIGN PATENT DOCUMENTS

JP        09-305520        11/1997

OTHER PUBLICATIONS

IDE—Hardware Reference & Information Document Sep. 11, 1996.*
Aki Terutani, "Research on Complete Application of ATA (IDE)/ATAPI which Connects Storage to an Inclusion Device"; Interface vol. 26, No. 7, Japan, Co Publication Co., Ltd.; Jul. 1, 2000; vol. 26, No. 7., pp. 62–74.
Japanese Office Action dated Oct. 27, 2004 with a partial English translation.

* cited by examiner

Primary Examiner—Paul R. Myers
(74) Attorney, Agent, or Firm—McGinn & Gibb, PLLC

(57) ABSTRACT

A 40/80-core cable discriminating method comprises the steps of setting a detecting period for detecting a first state of the PDIAG-signal, the detecting period being not shorter than a first time, the first time is necessary that the PDIAG-signal has been changed into the first state, and discriminating, by detecting the state of the PDIAG-signal during the detecting period, which the 40-core or the 80-core cable is used.

25 Claims, 8 Drawing Sheets

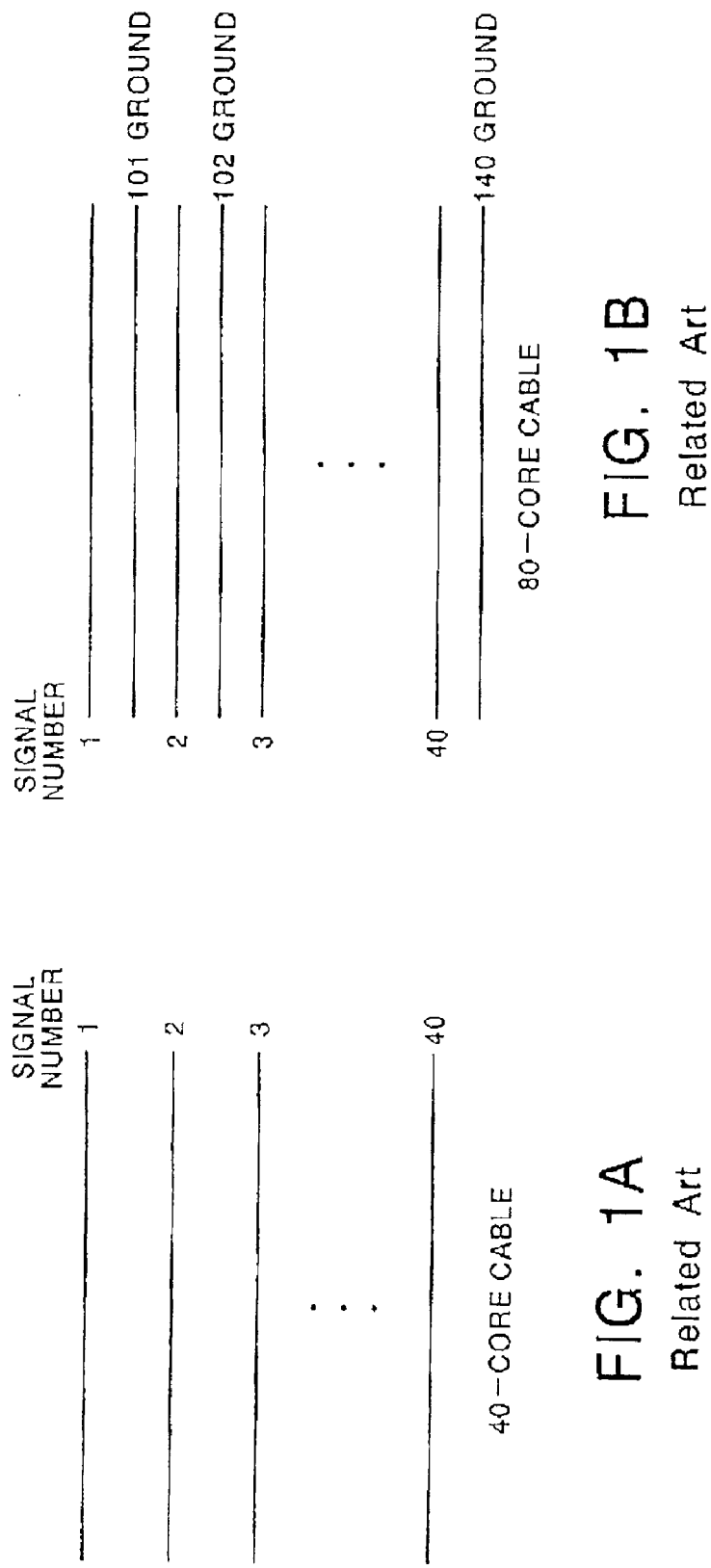

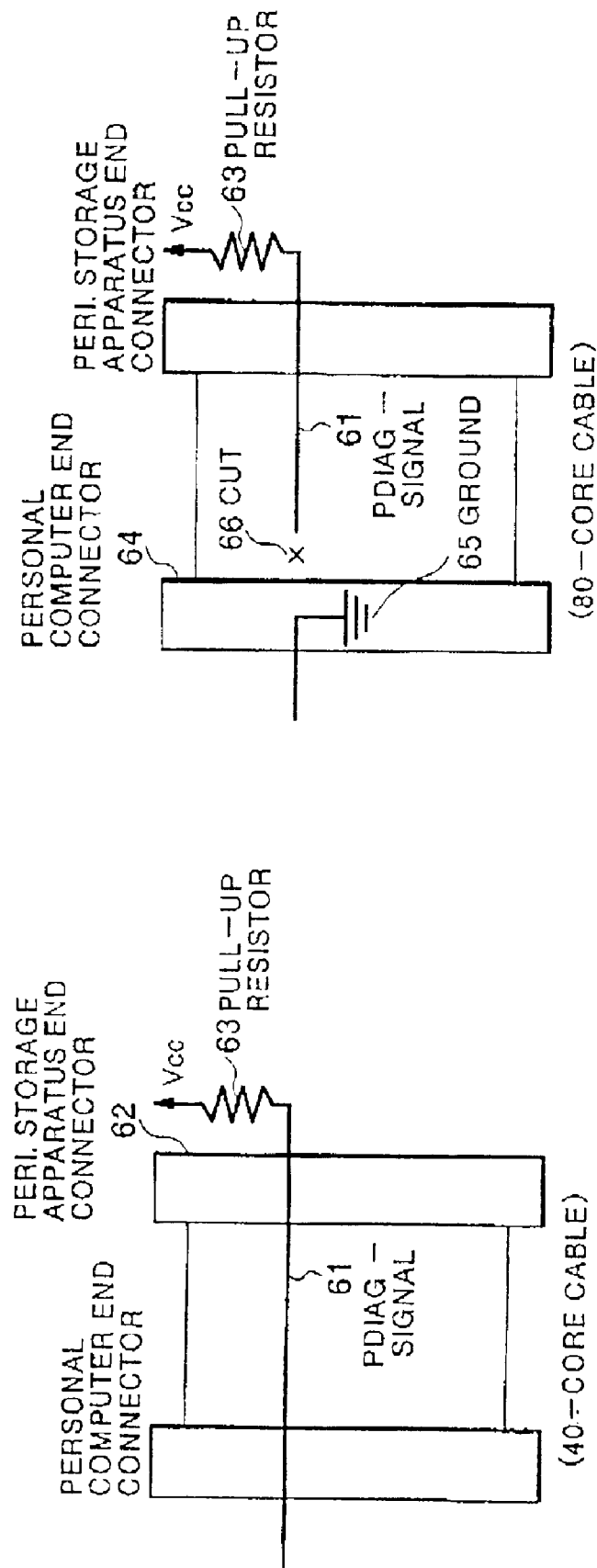

(ARRANGING CAPACITOR)

(OBSERVING PDIAG−SIGNAL)

| PDIAG— =HIGH STATE | 40—CORE CABLE |
| --- | --- |
| PDIAG— =LOW STATE | 80—CORE CABLE |

40/80-CORE CABLE DISCRIMINATING METHOD AND SYSTEM PERFORMING EXACT DISCRIMINATION ALTHOUGH MASTER AND SLAVE STORAGE APPARATUSES ARE CONNECTED HOST

BACKGROUND OF THE INVENTION

This invention relates to a 40/80-core cable discriminating method of discriminating an IDE-bus-cable (an 80-core cable) having eighty core-wires or an IDE-bus-cable (a 40-core cable) having forty core-wires. The 80-core cable is required when a data transmitting speed not less than 66 MB/S should be achieved on an ultra DMA (ultra Direct Memory Access) system related to an IDE (Integrated Drive Electronics) bus which is standardized by ATA (AT Attachment)-standards (which will be called an "ATA (IDE) bus").

As an interface between a personal computer and a peripheral storage apparatus, the ATA (IDE) bus developed by IBM (International Business Machines) corporation is known. The ATA (IDE) bus was designed at first as a data transmitting system performed by a CPU which uses a PIO system having 3.3 MB/S in clock speed by using the 40-core cable having eighteen inches (one and a half feet) in length. As the personal computer and the peripheral storage apparatus are accelerated in processing speed or data transmitting speed, the ATA (IDE) bus in the data transmitting system became a bus-bottleneck which obstructs an acceleration of the processing speed for the personal computer because the transmitting speed of 3.3 MB/S is too slow, Therefore the acceleration in speed of the ATA (IDE) bus is required. In order to meet the requirement, the ATA (IDE) bus of 3.3 MB/S has been settled into a MODE 0 as the basis of a compatible mode and a MODE 1 (5.2 MB/S), a MODE 2 (8.3 MB/S), a MODE 3 (11.1 MB/S), and a MODE 4 (16.7 MB/S) have been designed with accelerated transmitting speed and with compatibility to a lower level, each data transmitting speed being accelerated by only shortening intervals of transmitted data. On the other hand, the ATA (IDE) bus using a DMA (Direct memory Access) system and which does not utilize the PIO system for data transmission was designed. Because the DMA system does not use the CPU for data transmission, the DMA system has a merit such that a load of the CPU can be reduced. As the DMA system, a MODE 0 (4 MB/S), a MODE 1 (13.3 MB/S), and a MODE 2 (16.7 MB/S) have been designed.

With the data transmitting speed of 16.6 MB/S or 16.7 MB/S as the fastest speed by the PIO and the DMA systems, however, it became the bus bottleneck because the processing speeds of the personal computer and the peripheral apparatus were further accelerated recently and therefore more acceleration of the data transmitting speed of the ATA (IDE) bus was required. However, the acceleration of the data transmitting speed by only shortening the intervals of the transmitted data for further acceleration of the data transmission speed reached the margin as the intervals are excessively shortened and therefore sequent data interfere with each other. Therefore, the ultra DMA system was designed after the PIO and the DMA system. The ultra DMA system can, differently from the PIO and the DMA systems, provide correctness of data by specially giving a CRC (Cyclic Redundancy Check) data, that is, a data for detecting consistency after each burst transmission. The CRC data have a function as same as a parity data such as to check transmitted data include error or not. This thus provides further acceleration of the data transmitting speed so that the data transmitting speeds of 3.3 MB/S, 66.7 MB/S, and 100 MB/S are achieved.

However, when the 40-core cable having eighteen inches is used for performing the data transmitting speed not less than 66 MB/S, it is difficult to provide the consistency of data because crosstalks occurs between each data transmitted in core wires. Therefore, it is difficult to realize the data transmitting speed not less than 66 MB/S. Thus, the 80-core cable has been designed in order to settle the matter.

It necessary for transmitting of the data transmitting speed not less than 66 MB/S without spoiling the signal quality to discriminate which the 80-core cable or the 40-core cable is used.

Related to a 40/80-core cable discriminating method, there is a discriminating method with using a PDIAG-signal included signals used in the ATA (IDE) bus. Although, the PDIAG-signal is originally used so that the personal computer can discriminate which a master storage apparatus or the master and a slave storage apparatuses is connected to the personal computer. Because the slave (and the master) storage apparatus(es) is (are) connected to the personal computer, the slave storage apparatus outputs the PDIAG-signal in a LOW state. Namely, the PDIAG-signal is basically output as an "active=LOW" state from the slave storage apparatus. Consequently, the personal computer can discriminate that only the master storage apparatus is connected to the personal computer when a HIGH state is detected while that the master and the slave storage apparatuses are connected to the personal computer when the LOW state is detected.

Because the PDIAG-signal is basically used only when (a medium of) the slave storage apparatus is formatted, the PDIAG-signal is thus used for the 40/80-core cable discriminating method.

According to the wiring of the core wire of the PDIAG-signal mentioned above, the 40/80-core cable discriminating method can be performed for example as first and second methods as follows. In a first 40/80-core cable discriminating method, a capacitor is provided in the personal computer. On the other hand, in a second 40/80-core cable discriminating method, the PDIAG-signal is observed by a general-purpose IO (Input and Output) port.

The first method discriminates which the 80-core cable or the 40-core cable is use by using a recharging time for charging the capacitor. Because the PDIAG-signal is cut or broken off before the connector connected to the personal computer when the 80-core cable is connected to the personal computer, the PDIAG-signal is not connected to the capacitor. On the other hand, when the 40-core cable is connected to the personal computer, the PDIAG-signal is connected to the capacitor. Consequently, when the peripheral storage apparatus is ordered as "perform to discriminate the cable", the peripheral storage apparatus sets the PDIAG-signal into a LOW state, switches into a TRI state, and switches into a HIGH state through a pull-up resistor of the peripheral storage apparatus. Namely, because each time for changing from the TRI state into the HIGH state is different from each other according as the peripheral storage apparatus is connected or disconnected to the capacitor, which the 80-core cable or the 40-core cable is used can be discriminated according to the difference of the changing time.

On the other hand, the second method has the personal computer capable of observing the PDIAG-signal. Because the PDIAG-signal is broken off before the connector connected to the personal computer while connected to the ground when the 80-core cable is used, the personal computer detects the LOW state. When the 40-core cable is used, the personal computer intactly detects the PDIAG-signal as the HIGH state. Thus, the personal computer discriminates as the 80-core cable when the LOW state is detected while as the 40-core cable when the HIGH state is detected.

The standards of the ATA (IDE) bus prescribe so that the master and the slave storage apparatuses can be at the same time connected to the personal computer as the peripheral storage apparatus. When the slave storage apparatus is connected to the personal computer, the PDIAG-signal provided from the slave storage apparatus may be in the LOW state depending on the situation. In this situations the personal computer may always detect the PDIAG-signal in the LOW state if each of the 40-core and the 80-core cables is connected to the personal computer. Therefore. the personal computer cannot discriminate which the 40-core or the 80-core cable is used.

SUMMARY OF THE INVENTION

It is therefore an object of this invention to provide a 40/80-core cable discriminating method which can exactly discriminate which a 40-core or an 80-core cable is used even if both of master and slave storage apparatuses are connected to a personal computer.

It is another object of this invention to provide a 40/80-core cable discriminating system which can exactly discriminate which a 40-core or an 80-core cable is used even if both of master and slave storage apparatuses are connected to a personal computer.

The other objects of this invention will become clear as the description proceeds.

According to an aspect of this invention, there is provided a 40/80-core cable discriminating method of discriminating between an 80-core cable having eighty core-wires and a 40-core cable having forty core-wires. The 40-core or the 80-core cable is connected between a host and a peripheral storage apparatus so as to form an IDE (Integrated Drive Electronics) bus defined by an ATA (AT Attachment) abbreviated to an ATA (IDE) bus. The 80-core cable is capable of performing transmission at a data transmitting speed not less than 66 MB/S supported on an ultra DMA (ultra Direct Memory Access) system related to the ATA (IDE) bus. The host is capable of detecting a PDIAG-signal which is used for the ATA (IDE) bus and which is generated by the peripheral storage apparatus. The method comprises the steps of setting a detecting period for detecting a first state of the PDIAG-signal, the detecting period being not shorter than a first time needed to change the PDIAG-signal into the first state and discriminating, by detecting the state of the PDIAG-signal during the detecting period, which the 40-core or the 80-core cable is used.

According to another aspect of this invention, there is provided a 40/80-core cable discriminating system for discriminating between an 80-core cable having eighty core-wires and a 40-core cable having forty core-wires. The 40-core or the 80-core cable is connected between a host and a peripheral storage apparatus so as to form an IDE (Integrated Drive Electronics) bus defined by an ATA (AT Attachment) abbreviated to an ATA (IDE) bus. The 80-core cable is capable of performing transmission at a data transmitting speed not less than 66 MB/S supported on an ultra DMA (ultra Direct Memory Access) system related to the ATA (IDE) bus. The host is capable of detecting a PDIAG-signal which is used for the ATA (IDE) bus and which is generated by the peripheral storage apparatus. The system comprises a detecting period setting unit for setting a detecting period for detecting a first state of the PDIAG-signal. The detecting period is not shorter than a first time needed to change the PDIAG-signal into the first state. The system further comprises a 40/80-core cable discriminating unit for discriminating, by detecting the state of the PDIAG-signal during the detecting period, which the 40-core or the 80-core cable is used.

The other features and advantages of this invention will become clear as the description proceeds.

BRIEF DESCRIPTION OF THE DRAWINGS

FIGS. 1A and 1B are concept diagrams respectively showing 40-core and 80-core cables;

FIGS. 2A and 2B are concept diagrams for respectively illustrating the 40-core and the 80-core cables;

DESCRIPTION OF THE PREFERRED EMBODIMENTS

Figures 3A, 3B:
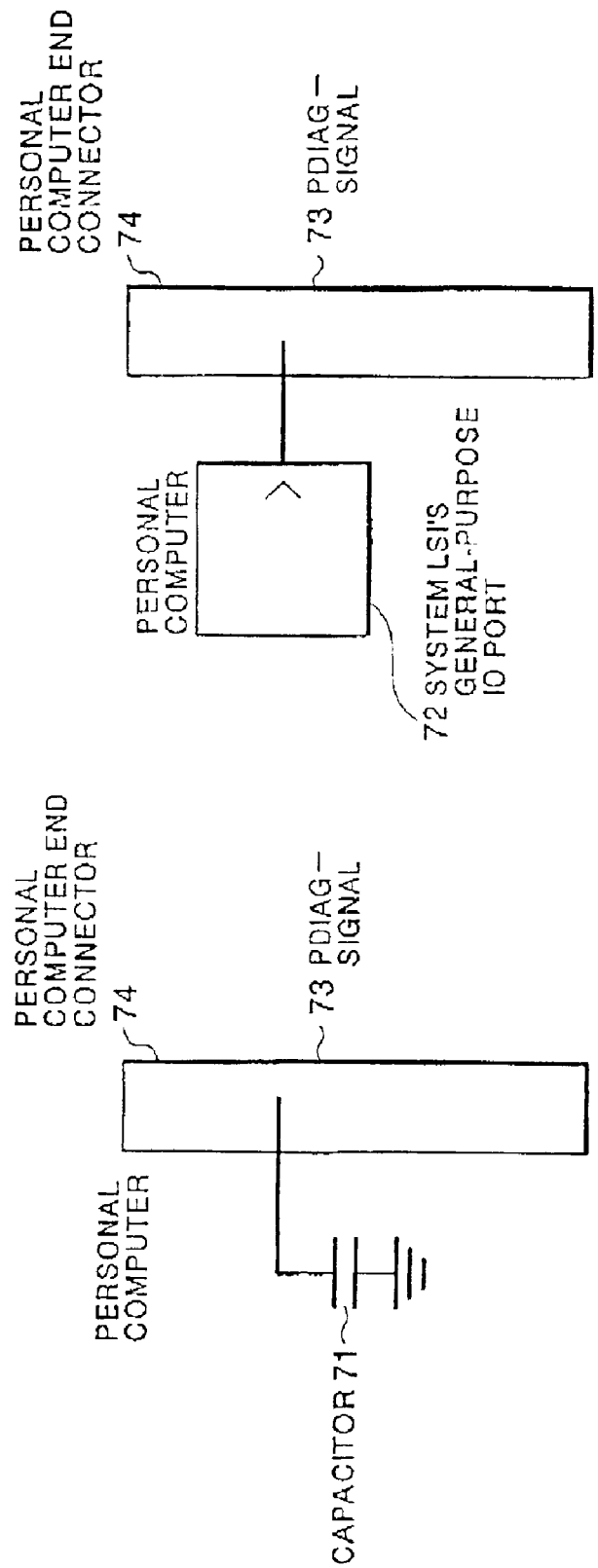
FIGS. 3A and 3B are concept diagrams for respectively illustrating first and second related 40/80-core cable discriminating methods.

In order to facilitate an understanding of this invention, description will at first be made about related 40/80-core cable discriminating methods described in the background of this specification with reference to the drawings.

FIGS 1A and 1B respectively show the 40-core and the 80-core cables. Referring to FIGS. 1A and 1B, the 40-core and the 80-core cables have forty signal wires 1, 2, 3, . . . , to 40, respectively. However, the 80-core cable has forty ground wires 101, 102, 103, . . . , to 140 parallel to the signal wires 1, 2, 3, . . . , to 40 so that the crosstalks between signal wires adjacent to each other are reduced. Consequently, even if the data transmitting speed is not less than 66 MB/S, the data transmission is realize without spoiling a signal quality. In other words, it however necessary for transmitting of the data transmitting speed not less than 66 MB/S without spoiling the signal quality to discriminate which the 80-core cable or the 40-core cable is used.

Related to a 40/80-core cable discriminating method, there is a discriminating method with using a PDIAG-signal included signals used in the ATA (IDE) bus. Although the PDIAG-signal is originally used so that the personal computer can discriminate which a master storage apparatus or the master and a slave storage apparatuses is connected to the personal computer. Because the slave (and the master) storage apparatus(es) is (are) connected to the personal computer, the slave storage apparatus outputs the PDIAG-signal in a LOW state as a second state. Namely, the PDIAG-signal is basically output as an "active=LOW" state from the slave storage apparatus. Consequently, the personal computer can discriminate that only the master storage apparatus is connected to the personal computer when a HIGH state as a first state is detected while that the master and the slave storage apparatuses are connected to the personal computer when the LOW state is detected.

Because the PDIAG-signal is basically used only when (a medium of) the slave storage apparatus is formatted, the PDIAG-signal is thus used for the 40/80-core cable discriminating method. Referring to FIG. 2A, (a core wire of) a PDIAG-signal 61 is directly connected from a personal computer through a connector connected to the personal computer and a connector 62 connected to a peripheral storage apparatus to a pull-up resistor 63 of the peripheral storage apparatus in the 40-core cable. On the other hand, (a core wire of) a PDIAG-signal 61 is connected to a ground and cut or broken off (at a broken point 66) before a connector 64 connected to a personal computer in the 80-core cable as shown in FIG. 2B.

According to the wiring of the core wire of the PDIAG-signal mentioned above, the 40/80-core cable discriminating method can be performed for example as first and second methods as follows. In a first 40/80-core cable discriminating method illustrated in FIG. 3A, a capacitor 71 is provided in the personal computer. On the other hand, in a second 40/80-core cable discriminating method illustrated in FIG. 3B, the PDIAG-signal is observed by a general-purpose IO (Input and Output) port 72.

The first method illustrated in FIG. 3A discriminates which the 80-core cable or the 40-core cable is use by using a recharging time fox charging the capacitor 71. Because a PDIAG-signal 73 is broken off before the connector 74 connected to the personal computer when the 80-core cable is connected to the personal computer, the PDIAG-signal 73 is not connected to the capacitor 71. On the other hand, when the 40-core cable is connected to the personal computer, the PDIAG-signal 73 is connected to the capacitor 71. Consequently, when the peripheral storage apparatus (not shown in FIGS. 3A and 3B) is ordered as "perform to discriminate the cable", the peripheral storage apparatus sets the PDIAG-signal 73 into a LOW state, switches into a TRI state, and switches into a HIGH state through a pull-up resistor (not shown) of the peripheral storage apparatus. Namely, because each time for changing from the TRI state into the HIGH state is different from each other according as the peripheral storage apparatus is connected or disconnected to the capacitor 71, which the 80-core cable or the 40-core cable is used can be discriminated according to the difference of the changing time.

On the other hand, the second method illustrated in FIG. 3B has the personal computer capable of observing the PDIAG-signal. Because the PDIAG-signal 73 is broken off before the connector 74 connected to the personal computer while connected to the ground when the 80-core cable is used, the personal computer detects the LOW state. When the 40-core cable is used, the personal computer intactly detects the PDIAG-signal 73 as the HIGH state. Thus, the personal computer discriminates as the 80-core cable when the LOW state is detected while as the 40-core cable when the HIGH state is detected.

Now, preferred embodiments of this invention will be described with reference drawings.

The 80-core cable to which 40/80-core cable discriminating system and method according to this invention are applicable is used for realizing a data transmitting speed not less than 66 MB/S in the ultra DMA system used in the ATA (IDE) bus. The 40/80-core cable discriminating system and method according to this invention can exactly discriminate which the 40-core or the 80-core cable is used even if both of master and slave storage apparatuses are connected to a personal computer.

In order to discriminate the 80-core cable, it is necessary to generate a PDIAG-=HIGH state.

Figure 4A:
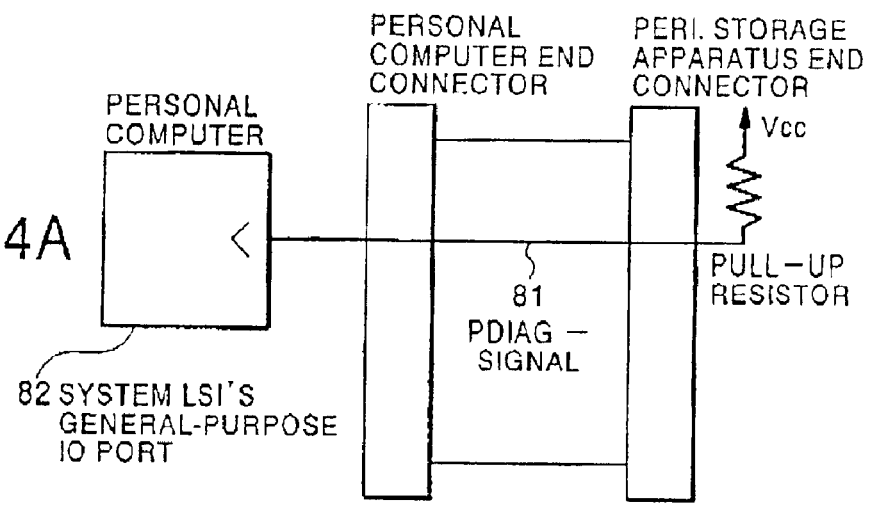
FIGS. 4A and 4B are concept diagrams for illustrating a 40/80-core cable discriminating method according to this invention when the 40-core cable is used and when the 80-core cable is used, respectively.
Figure 4B:
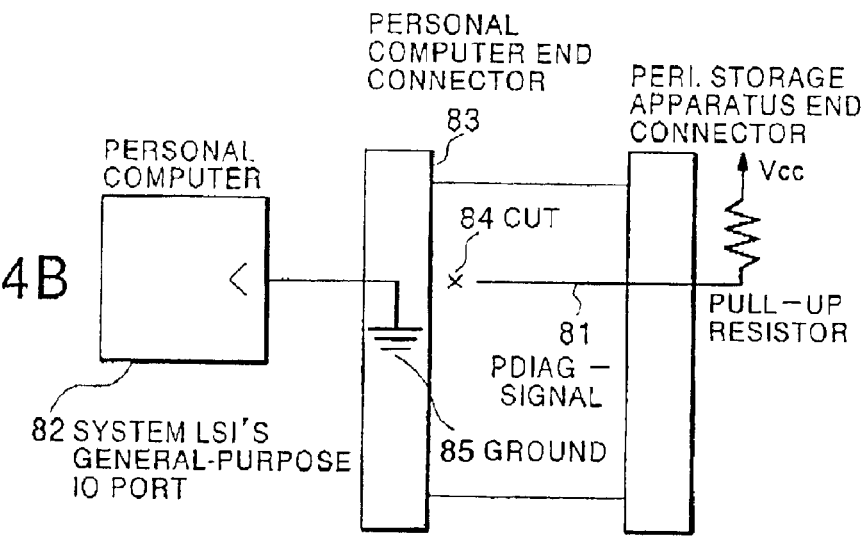

When only the master storage apparatus is installed and connected to the personal computer, a PDIAG-signal 81 is only connected to a pull-up resistor of the peripheral storage apparatus (the master storage apparatus) as shown in FIGS. 4A and 4B. Namely, the PDIAG-signal 81 is always kept a HIGH state. When the 40-core cable is connected between the personal computer and the master storage apparatus, the PDIAG-signal 81 is connected to a general-purpose IO port 82 of a system LSI (Large Scale Integrated circuit) in the personal computer as shown in FIG. 4A. On the other hand, when the 80-core cable is connected between the personal computer and the master storage apparatus, the PDIAG-signal 81 is cut or broken off (at a broken point 84) before the connector 83 connected to the personal computer and the general-purpose IO port 82 is connected to a ground 85 in the connector 83. Consequently, the personal computer discriminates as the 40-core cable when the HIGH state (PDIAG-=HIGH state) is detected while as the 80-core cable when a LOW state (PDIAG-=LOW state) is detected.

Figure 5:
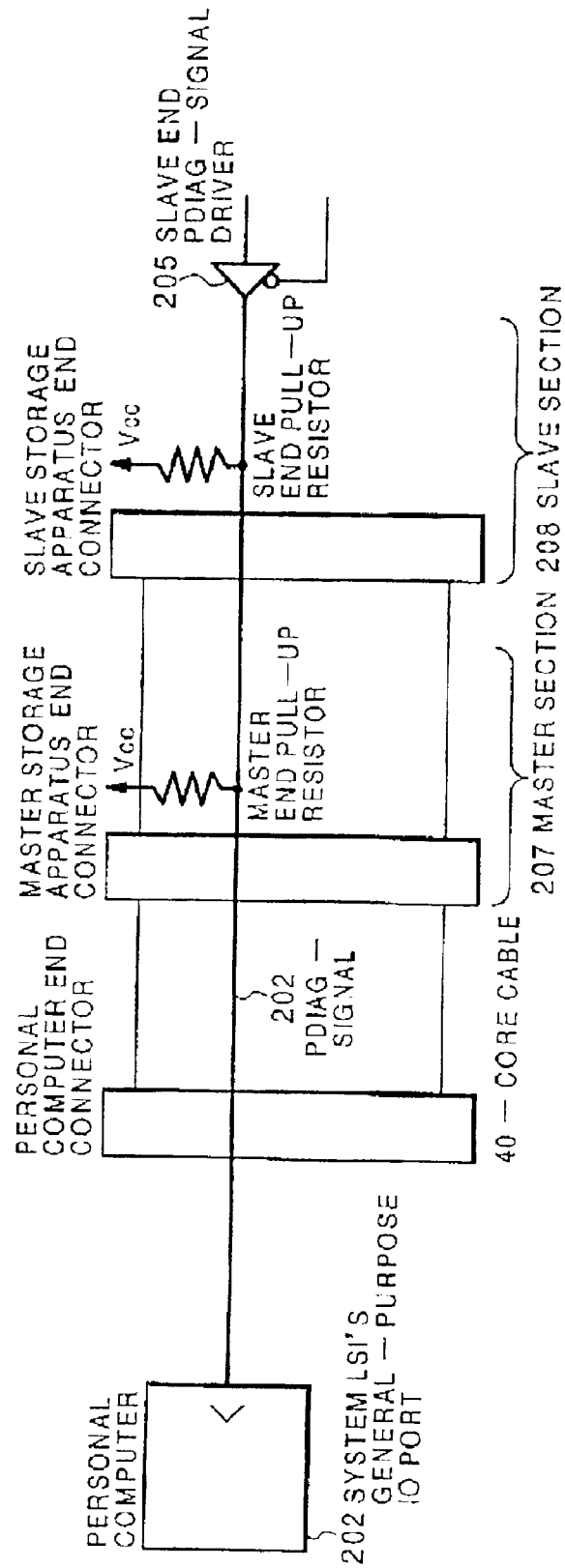
FIG. 5 is a concept diagram for illustrating the 40/80-core cable discriminating method according to this invention.

However, the standards of the ATA (IDE) bus prescribe so that the master and the slave storage apparatuses can be at the same time connected to the personal computer through the 40-core or the 80-core cable. FIG. 5 shows a situation that master and slave storage apparatus sections 207 and 208 are connected to the personal computer as the peripheral storage apparatus. Referring to FIG. 5, the PDIAG-signal 202 is changed up and down because of the specification of the ATA (IDE) bus such that a PDIAG-signal 202 is driven by a PDIAG-signal driver 205 provided in the slave storage section 208. Therefore, when the 40-core cable is connected among the personal computer, the master storage section 207, and the slave storage section 208, the personal computer detects the LOW state through the general-purpose IO port 206 if the PDIAG-signal driver 205 provided in the slave storage section 208 generates the PDIAG-=LOW state. On the other hand, when the 80-core cable is connected among the personal computer, the master storage section 207, and the slave storage section 208, the personal computer also detects the LOW state as well as a case that only the master storage apparatus is connected to the personal computer. Namely, the personal computer always detects the PDIAG-signal in the Low state if each of the 40-core and the 80-core cables is connected to the personal computer. Therefore, the personal computer cannot discriminate which the 40-core or the 80-core cable is used.

Figure 6:
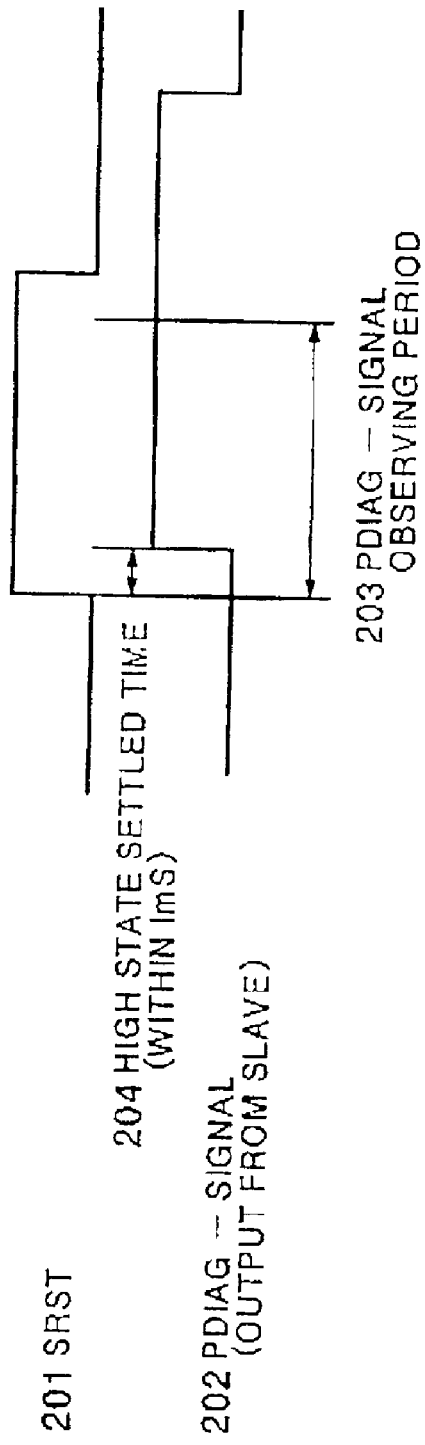
FIG. 6 is a concept diagram for illustrating the 40/80-core cable discriminating method according to this invention.

This invention makes the PDIAG-signal driver 205 to generate the PDIAG-=HIGH state. FIG. 6 shows how the 40/80-core cable discriminating system make the PDIAG-signal driver 205 (shown in FIG. 5) to generate the PDIAG-signal 202 in the PDIAG-=HIGH state when the master and the slave storage apparatus sections 207 and 208 (shown in FIG. 5) are connected to the personal computer.

If the personal computer provides (the PDIAG-signal driver 205 of) the slave storage apparatus section 208 with an SRST (a Software (S/W) reset) 201 when the master and the slave storage apparatus sections 207 and 208 are connected to the personal computer, the PDIAG-signal driver 205 changes the PDIAG-signal 202 into the HIGH state within 1 mS as a HIGH state settled time 204. While the SRST 201 form the personal computer is in the HIGH state, the PDIAG-signal driver 205 keeps on generating the PDIAG-signal 202 in the HIGH state. This procedure is prescribed related to specifications of the standards of the ATA (IDE) bus. The 40/80-core cable discriminating system adopts a PDIAG-signal observing period 203 within a period since the personal computer generates the SRST 201 before or until the personal computer releases the SRST 201.

A 40/80-core cable discriminating system according to a first embodiment of this invention is used for discriminating between an 80-core cable having eighty core-wires and a 40-core cable having forty core-wires. The 40-core or the 80-core can be connected between a personal computer as a host and a peripheral storage apparatus so as to form the ATA (IDE) bus. The 80-core cable can perform transmission at a data transmitting speed not less than 66 MB/S supported on the ultra DMA system related to the ATA (IDE) bus. The personal computer can detect the PDIAG-signal which is used for the ATA (IDE) bus and which is generated by the peripheral storage apparatus.

The system comprises a detecting period setting unit and a 40/80-core cable discriminating unit.

The detecting period setting unit is used for setting a detecting period for detecting a HIGH state of the PDIAG-signal. The detecting period is not shorter than a first time. The first time is necessary that the PDIAG-signal has been changed into the HIGH state The 40/80-core cable discriminating,unit is used for discriminating, by detecting the state of the PDIAG-signal during the detecting period, which the 40-core or the 80-core cable is used.

The system may further comprise an SRST signal providing unit and a second time setting unit. The SRST signal providing unit is used for providing the peripheral storage apparatus with an SRST signal for commanding the peripheral storage apparatus to perform a software-resetting, the PDIAG-signal being changed into the HIGH state when the peripheral storage apparatus is provided with the SRST signal. The second time setting unit is used for setting a second time. The second time is necessary that the SRST signal has been changed into the HIGH state. The 40-core or the 80-core cable is used after the second time has passed.

The second time may be not shorter than 5 $\mu$S. The first time may be not shorter than 1 mS. The second time may be not shorter than 1 mS.

The 40/80-core cable discriminating unit may discriminate, when a master storage apparatus is only connected to the personal computer as the peripheral storage apparatus, that the 40-core cable is used if the PDIAG-signal takes the HIGH state while that the 80-core cable is used if the PDIAG-signal takes a LOW state.

A protocol period may be, when master and slave storage apparatuses are connected to the personal computer as the peripheral storage apparatus, adopted as the detecting period. The protocol period may be the sum of a first through a third protocol periods. The first protocol period being that an SRST signal is provided to the peripheral storage apparatus. The SRST signal serves to commanding the peripheral storage apparatus to perform a software-resetting. The second protocol period is that the peripheral storage apparatus changes the PDIAG-signal into the HIGH state within the PDIAG-signal has been settled into the HIGH state. The third protocol period is that the PDIAG-signal is kept on the HIGH state while the SRST signal takes the HIGH state.

These units may be structured by hardware-parts and/or software-parts of the personal computer and/or the peripheral storage apparatus.

Now, first and second embodiments as 40/80-core cable discriminating methods according to this invention will be described with reference drawings. The first and the second embodiments are, for example, carried out as operations of the 40/80-core cable discriminating systems according to this invention mentioned above.

First Embodiment

Figure 7:
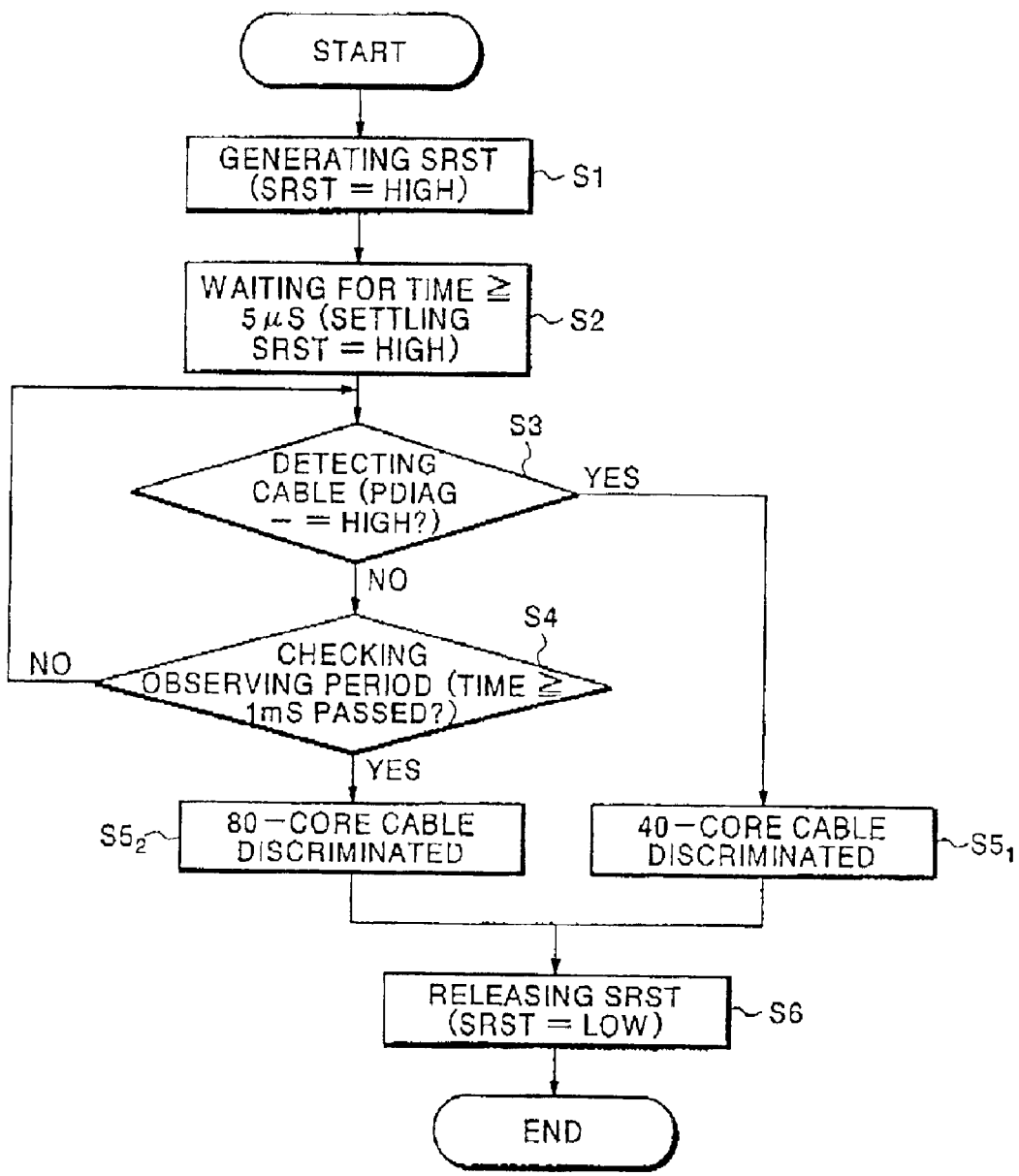
FIG. 7 is a flow chart for illustrating a 40/80-core cable discriminating method according to a first embodiment of this invention.

As shown in FIG. 7, a 40/80-core cable discriminating method of the first embodiment has a step of generating and providing the peripheral apparatus with an SRST signal for make an SRST=HIGH state so that the peripheral storage apparatus begins to perform a software-reset (S1), a step of waiting not less than 5 $\mu$S in order to match a width of the SRST=HIGH state with specifications of the standards related to the ATA (IDE) bus (S2), a step of detecting the PDIAG-signal (S3), a step of checking an observing period of the PDIAG-signal (S4), steps of knowing the results of discriminating (S51, S52), and a step of releasing the SRST (S6).

Referring to FIG. 7, the personal computer generates and provides the peripheral apparatus with the SRST signal (S1). Generation of the SRST signal namely signifies the start of the software-reset by the peripheral apparatus. The software-reset is realized since an SRST=LOW state normally existing is changed into the SRST=HIGH state, the SRST=HIGH state is kept on not less than 5 $\mu$S, and thus the SRST=HIGH state is changed into the SRST=LOW again. Therefore, the personal computer waits not less than 5 $\mu$S in order to settle the width of the SRST=HIGH state (S2).

After that the personal computer waits until a time not less than 5 $\mu$S has been passed, the personal computer begins to detect a state of the PDIAG-signal (S3). The personal computer directly detects which the PDIAG-signal provided through a general-purpose IO port is the HIGH state or the LOW state. If the PDIAG-signal takes the HIGH state as the result of detecting, the personal computer discriminates the 40-core cable is used (S51).

On the other hand, if the PDIAG-signal takes the LOW state as the result of detecting, the personal computer proceeds to the step S4. In the step S4, because the standards related the ATA (IDE) bus the personal computer prescribe as "a time that the PDIAG-=HIGH state must be settled by the SRST=HIGH is not longer than 1 mS", an observing period for observing the state of the PDIAG-signal is set as not less than 1 mS. Consequently, the personal computer keep on observing the PDIAG-signal at least of 1 mS after that the SRST signal is generated and provided to the peripheral storage apparatus (S1). As the result of detecting, if the PDIAG-signal is never the HIGH state, the personal computer discriminates the 80-core cable is used (S52).

After discrimination, the personal computer releases the SRST=HIGH state (S6) so that the SRST signal is changed into the SRST=LOW and that the software-reset is finished.

Thus, the 40/80-core cable discriminating method can exactly discriminate which the 40-core or the 80-core cable is used even if both of the master and the slave storage apparatuses are connected to the personal computer. Consequently, the personal computer can automatically set the data transmitting speed when the peripheral storage apparatus is connected thereto. This provides the user of the personal computer with saving a disadvantageous deal that the user investigates the peripheral storage apparatus and manually sets the data transmitting speed. Furthermore, because the 40-core and the 80-core cables are never confused with each other, the peripheral storage apparatus is used at the data transmitting speed not less than 66.7 MB/S on the ultra DMA system with using the 40-core cable. Thus, it is avoided that the quality of data is worse because of the mistake of a cable prevented.

Second Embodiment

Figure 8:
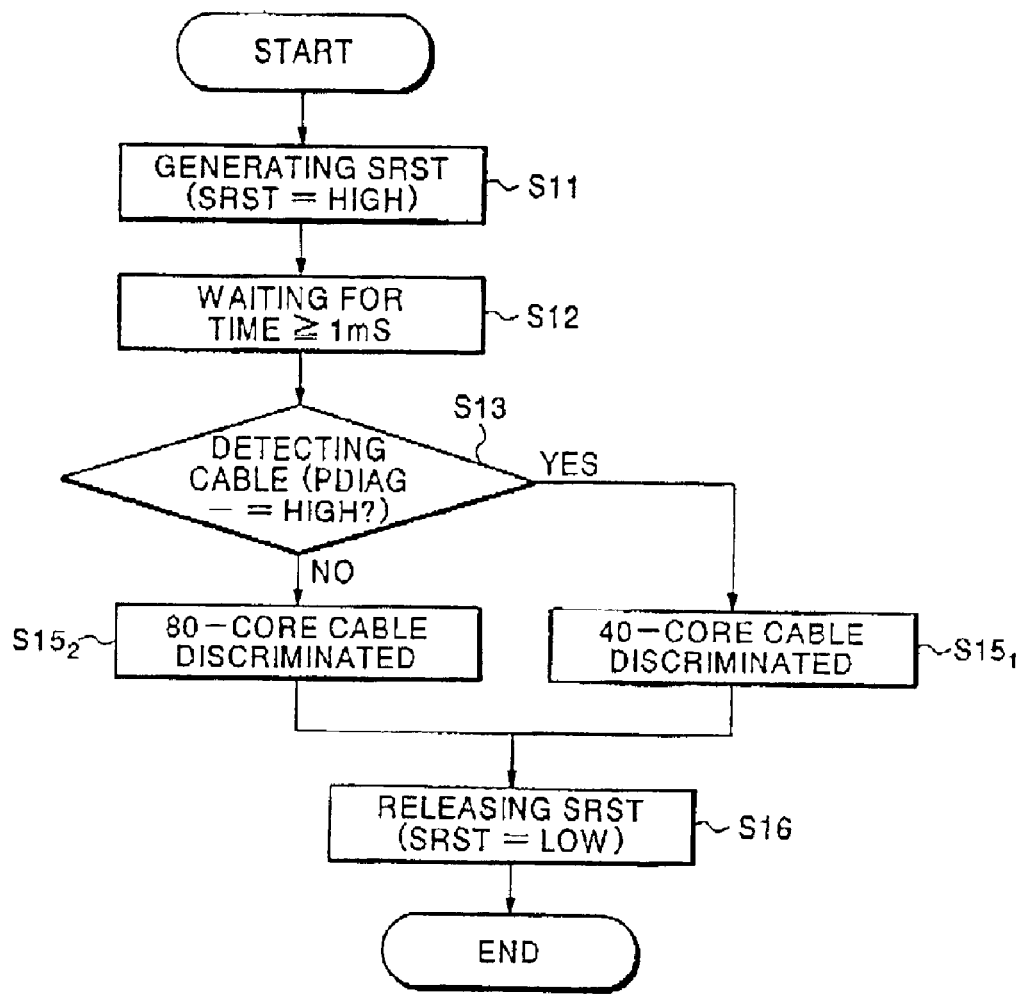
FIG. 8 is a flow chart for illustrating a 40/80-core cable discriminating method according to a second embodiment of this invention.

Referring to FIG. 8, a 40/80-core cable discriminating method of the second embodiment has a step S11 as well as the step S1 of the first embodiment. However, the personal computer waits not less than 1 mS in order to settle the width of the SRST=HIGH state (S12). After that the personal computer waits until a time not less than 1 mS has been passed, the personal computer detects a state of the PDIAG-signal (S13) as like to the step S3 of the first embodiment. As the result of detecting, the personal computer discriminates the 40-core cable is used (S151) if the PDIAG-signal takes the HIGH state while the 80-core cable is used (S152) if the PDIAG-signal takes the LOW state. After discrimination, the personal computer releases the SRST=HIGH state (S16). Thus, the 40/80-core cable discriminating method of the second embodiment can also discriminate exactly which the 40-core or the 80-core cable is used even if both of the master and the slave storage apparatuses are connected to the personal computer.

While this invention has thus far been described in conjunction with embodiments thereof, it will readily be possible for those skilled in the art to put this invention into practice in various other manners.

What is claimed is:

1. A 40/80-core cable discriminating method of discriminating between an 80-core cable having eighty core-wires and a 40-core cable having forty core-wires, the 40-core or the 80-core cable being connected between a host and a peripheral storage apparatus so as to form an IDE (Integrated Drive Electronics) bus defined by an ATA (AT Attachment) abbreviated to an ATA (IDE) bus, the 80-core cable being capable of performing transmission at a data transmitting speed not less than 66 MB/S supported on an ultra DMA (ultra Direct Memory Access) system related to the ATA (IDE) bus, the host being capable of detecting a PDIAG-signal which is used for the ATA (IDE) bus and which is generated by the peripheral storage apparatus, said method comprising:

setting a detecting period for detecting a first state of the PDIAG-signal, said detecting period being not shorter than a first time needed to change the PDIAG-signal into said first state; and discriminating, by detecting the state of the PDIAG-signal during said detecting period, which of the 40-core cable and the 80-core cable is used, wherein the 40-core cable is discriminated as being used if the state of the PDIAG-signal comprises a first predetermined state and the 80-core cable is discriminated as being used if the state of the PDIAG-signal comprises a second predetermined state, wherein, when master and slave storage apparatuses as the peripheral storage apparatus are connected to the host, a protocol period is adopted as said detecting period, wherein said protocol period comprises the sum of a first protocol period, a second protocol period and a third protocol period, wherein said first protocol period comprises a period that an SRST signal is provided to the peripheral storage apparatus, said SRST signal serving to command the peripheral storage apparatus to perform a software-resetting, wherein said second protocol period comprises a period that the peripheral storage apparatus changes the PDIAG-signal into said first state within the PDIAG-signal has been settled into said first state, and wherein said third protocol period comprises a period that the PDIAG-signal is kept on said first state while the SRST signal is in said first state.

2. A 40/80-core cable discriminating method as claimed in claim 1, further comprising:

providing the peripheral storage apparatus with an SRST signal for commanding the peripheral storage apparatus to perform a software-resetting, the PDIAG-signal being changed into said first state when the peripheral storage apparatus is provided with said SRST signal; and setting a second time needed to change the SRST signal into said first state, said discriminating comprising discriminating which of the 40-core cable and or the 80-core cable is used after said second time has passed.

3. A 40/80-core cable discriminating method as claimed in claim 2, wherein said second time is not shorter than 5 $\mu$S.

4. A 40/80-core discriminating method as claimed in claim 2, wherein said PDIAG-signal is changed into said high state when the peripheral storage apparatus is provided with said SRST signal.

5. A 40/80-core discriminating method as claimed in claim 2, further comprising:

releasing said SRST signal after said discriminating so that said SRST signal is changed to said low state.

6. A 40/80-core cable discriminating method as claimed in claim 1, wherein said first time is not shorter than 1 mS.

7. A 40/80-core cable discriminating method as claimed in claim 1, wherein said first time is not shorter than 1 mS.

8. A 40/80-core cable discriminating method as claimed in claim 1, wherein, when only a master storage apparatus as the peripheral storage apparatus is connected to the host, said discriminating comprises discriminating that the 40-core cable is used if the PDIAG-signal takes the first state while that the 80-core cable is used if the PDIAG-signal takes a second state.

9. A 40/80-core cable discriminating method as claimed in claim 1, wherein the 40-core cable is discriminated as being used if the state of the PDIAG-signal comprises a high state arid the 80-core cable is discriminated as being used if the state of the PDIAG-signal comprises a low state.

10. A 40/80-core cable discriminating system for discriminating between an 80-core cable having eighty core-wires and a 40-core cable having forty core-wires, the 40-core or the 80-core cable being connected between a host and a peripheral storage apparatus so as to form an IDE (Integrated Drive Electronics) bus defined by an ATA (AT Attachment) abbreviated to an ATA (IDE) bus, the 80-core cable being capable of performing transmission at a data transmitting speed not less than 66 MB/S supported on an ultra DMA (ultra Direct Memory Access) system related to the ATA (IDE) bus, the host being capable of detecting a PDIAG-signal which is used for the ATA (IDE) bus and which is generated by the peripheral storage apparatus, said system comprising:

a detecting period setting unit for setting a detecting period for detecting a first state of the PDIAG-signal, said detecting period being not shorter than a first time needed to change the PDIAG-signal into said first state; and a 40/80-core cable discriminating unit for discriminating, by detecting the state of the PDIAG-signal during said detecting period, which of the 40-core cable and the 80-core cable is used, wherein the 40-core cable is discriminated as being used if the state of the PDIAG-signal comprises a first predetermined state and the 80-core cable is discriminated as being used if the state of the PDIAG-signal comprises a second predetermined state, wherein, when master and slave storage apparatuses as the peripheral storage apparatus are connected to the host, a protocol period is adapted as said detecting period, wherein said protocol period comprises the sum of a first protocol period, a second protocol period and a third protocol period, wherein said first protocol period comprises a period that an SRST (software reset) signal is provided to the peripheral storage apparatus, said SRST signal serving to command the peripheral storage apparatus to perform a software-resetting, wherein said second protocol period comprises a period that the peripheral storage apparatus changes the PDIAG-signal into said first state within the PDIAG-signal has been settled into said first state, and wherein said third protocol period comprises a period that the PDIAG-signal is kept on said first state while the SRST signal is in said first state.

11. A 40/80-core cable discriminating system as claimed in claim 10, wherein said system further comprises:

an SRST (software reset) signal providing unit for providing the peripheral storage apparatus with an SRST signal for commanding the peripheral storage apparatus to perform a software-resetting, the PDIAG-signal being changed into said first state when the peripheral storage apparatus is provided with said SRST signal; and a second time setting unit for setting a second time needed to change the SRST signal into said first state, said 40/80-core cable discriminating unit being for discriminating which of the 40-core cable and the 80-core cable is used after said second time has passed.

12. A 40/80-core cable discriminating system as claimed in claim 11, wherein said second time is not shorter than 5 µS.

13. A 40/80-core cable discriminating system as claimed in claim 11, further comprising:

a PDIAG-signal driver for changing the state of the PDIAG-signal.

14. A 40/80-core cable discriminating system as claimed in claim 10, wherein said first time is not shorter than 1 mS.

15. A 40/80-core cable discriminating system as claimed in claim 10, wherein said second time is not shorter than 1 mS.

16. A 40/80-core cable discriminating system as claimed in claim 10, wherein, when only a master storage apparatus as the peripheral storage apparatus is connected to the host, said 40/80-core cable discriminating unit comprises a unit for discriminating that the 40-core cable is used if the PDIAG-signal takes the first state and that the 80-core cable is used if the PDIAG-signal takes a second state.

17. A 40/80-core cable discriminating system as claimed in claim 10, wherein the 40-core cable is discriminated as being used if the state of the PDIAG-signal comprises a high state and the 80-core cable is discriminated as being used if the state of the PDIAG-signal comprises a low state.

18. A 40/80-core cable discriminating method of discriminating between an 80-core cable having eighty core-wires and a 40-core cable having forty core-wires, the 40-core or the 80-core cable being connected between a host and a peripheral storage apparatus so as to form an IDE (Integrated Drive Electronics) bus defined by an ATA (AT Attachment) abbreviated to an ATA (IDE) bus, the 80-core cable being capable of performing transmission at a data transmitting speed not less than 66 MB/S supported on an ultra DMA (ultra Direct Memory Access) system related to the ATA (IDE) bus, the host being capable of detecting a PDIAG-signal which is used for the ATA (IDE) bus and which is generated by the peripheral storage apparatus, said method comprising:

setting a detecting period for detecting a first state of the PDIAG-signal, said detecting period being not shorter than a first time needed to change the PDIAG-signal into said first state; and discriminating, by detecting the state of the PDIAG-signal during said detecting period, which of the 40-core cable and the 80-core cable is used, wherein the 40-core cable is discriminated as being used if the state of the PDIAG-signal comprises a first predetermined state and the 80-core cable is discriminated as being used if the state of the PDIAG-signal comprises a second predetermined state, wherein, when master and slave apparatuses as the peripheral storage apparatus are connected to the host, a protocol period is adopted as said detecting period, wherein said protocol period comprises the sum of a first protocol period, a second protocol period and a third protocol period, and wherein said first protocol period comprises a period that an SRST signal is provided to the peripheral storage apparatus, said SRST signal serving to command the peripheral storage apparatus to perform a software-resetting.

19. A 40/80-core cable discriminating method of discriminating between an 80-core cable having eighty core-wires and a 40-core cable having forty core-wires, the 40-core or the 80-core cable being connected between a host and a peripheral storage apparatus so as to form an IDE (Integrated Drive Electronics) bus defined by an ATA (AT Attachment) abbreviated to an ATA (IDE) bus, the 80-core cable being capable of performing transmission at a data transmitting speed not less than 66 MB/S supported on an ultra DMA (ultra Direct Memory Access) system related to the ATA (IDE) bus, the host being capable of detecting a PDIAG-signal which is used for the ATA (IDE) bus and which is generated by the peripheral storage apparatus, said method comprising:

setting a detecting period for detecting a first state of the PDIAG-signal, said detecting period being not shorter than a first time needed to change the PDIAG-signal into said first state; and discriminating, by detecting the state of the PDIAG-signal during said detecting period, which of the 40-core cable and the 80-core cable is used, wherein the 40-core cable is discriminated as being used if the state of the PDIAG-signal comprises a first predetermined state and the 80-core cable is discriminated as being used, if the state of the PDIAG-signal comprises a second predetermined state, wherein, when master and slave apparatuses as the peripheral storage apparatus are connected to the host, a protocol period is adopted as said detecting period, wherein said protocol period comprises the sum of a first protocol period, a second protocol period and a third protocol period, and wherein said second protocol period comprises a period that an SRST signal is provided to the peripheral storage apparatus, said SRST signal serving to command the peripheral storage apparatus to perform a software-resetting.

20. A 40/80-core cable discriminating method of discriminating between an 80-core cable having eighty core-wires and a 40-core cable having forty core-wires, the 40-core or the 80-core cable being connected between a host and a peripheral storage apparatus so as to form an IDE (Integrated Drive Electronics) bus defined by an ATA (AT Attachment) abbreviated to an ATA (IDE) bus, the 80-core cable being capable of performing transmission at a data transmitting speed not less than 66 MB/S supported on an ultra DMA (ultra Direct Memory Access) system related to the ATA (IDE) bus, the host being capable of detecting a PDIAG-signal which is used for the ATA (IDE) bus and which is generated by the peripheral storage apparatus, said method comprising:

setting a detecting period for detecting a first state of the PDIAG-signal, said detecting period being not shorter than a first time needed to change the PDIAG-signal into said first state; and discriminating, by detecting the state of the PDIAG-signal during said detecting period, which of the 40-core cable and the 80-core cable is used, wherein the 40-core cable is discriminated as being used if the state of the PDIAG-signal comprises a first predetermined state and the 80-core cable is discriminated as being used if the state of the PDIAG-signal comprises a second predetermined state, wherein, when master and slave apparatuses as the peripheral storage apparatus are connected to the host, a protocol period is adopted as said detecting period, wherein said protocol period comprises the sum of a first protocol period, a second protocol period and a third protocol period, and wherein said third protocol period comprises a period that the peripheral storage apparatus changes the PDIAG-signal into said first state within the PDIAG-signal has been settled into said first state.

21. A 40/80-core cable discriminating system for discriminating between an 80-core cable having eighty core-wires and a 40-core cable having forty core-wires, the 40-core or the 80-core cable being connected between a host and a peripheral storage apparatus so as to form an IDE (Integrated Drive Electronics) bus defined by an ATA (AT Attachment) abbreviated to an ATA (IDE) bus, the 80-core cable in capable of performing transmission at a data transmitting speed not less than 66 MB/S supported on an ultra DMA (ultra Direct Memory Access) system related to the ATA (IDE) bus, the host being capable of detecting a PDIAG-signal which is used for the ATA (IDE) bus and which is generated by the peripheral storage apparatus, said system comprising:

means for setting a detecting period for detecting a first state of the PDIAG-signal, said detecting period being not shorter than a first time needed to change the PDIAG-signal into said first state; and means for discriminating, by detecting the state of the PDIAG-signal during said detecting period, which of the 40-core cable and the 80-core cable is used, wherein the 40-core cable is discriminated as being used if the state of the PDIAG-signal comprises a first predetermined state and the 80-core cable is discriminated as being used if the state of the PDIAG-signal comprises a second predetermined state, wherein, when master and slave apparatuses as the peripheral storage apparatus are connected to the host, a protocol period is adopted as said detecting period, wherein said protocol period comprises the sum of a first protocol period, a second protocol period and a third protocol period, and wherein said first protocol period comprises a period that an SRST signal is provided to the peripheral storage apparatus, said SRST signal serving to command the peripheral storage apparatus to perform a software-resetting.

22. A 40/80-core cable discriminating system as claimed in claim 21, means for providing the peripheral storage apparatus with an SRST signal for commanding the peripheral storage apparatus to perform a software-resetting, the PDIAG-signal being changed into said first state when the peripheral storage apparatus is provided with said SRST signal; and means for setting a second time needed to change the SRST signal into said first state, said discriminating comprising discriminating which of the 40-core cable and the 80-core cable is used after said second time has passed.

23. A 40/80-core cable discriminating method as claimed in claim 21, wherein the 40-core cable is discriminated as being used if the state of the PDIAG-signal comprises a high state and the 80-core cable is discriminated as being used if the state of the PDIAG-signal comprises a low state.

24. A 40/80-core cable discriminating system for discriminating between an 80-core cable having eighty core-wires and a 40-core cable having forty core-wires, the 40-core or the 80-core cable being connected between a host and a peripheral storage apparatus so as to form an IDE (Integrated Drive Electronics) bus defined by an ATA (AT Attachment) abbreviated to an ATA (IDE) bus, the 80-core cable being capable of performing transmission at a data transmitting speed not less than 66 MB/S supported on an ultra DMA (ultra Direct Memory Access) system related to the ATA (IDE) bus, the host being capable of detecting a PDIAG-signal which is used for the ATA (IDE) bus and which is generated by the peripheral storage apparatus, said system comprising:

means for setting a detecting period for detecting a first state of the PDIAG-signal, said detecting period being not shorter than a first time needed to change the PDIAG-signal into said first state; and means for discriminating, by detecting the state of the PDIAG-signal during said detecting period, which of the 40-core cable and the 80-core cable is used, wherein the 40-core cable is discriminated as being used if the state of the PDIAG-signal comprises a first predetermined state and the 80-core cable is discriminated as being used if the state of the PDIAG-signal comprises a second predetermined state, wherein, when master and slave apparatuses as the peripheral storage apparatus are connected to the host, a protocol period is adopted as said detecting period, wherein said protocol period comprises the sum of a first protocol period, a second protocol period and a third protocol period, and wherein said second protocol period comprises a period that an SRST signal is provided to the peripheral storage apparatus, said SRST signal serving to command the peripheral storage apparatus to perform a software-resetting.

25. A 40/80-core cable discriminating system for discriminating between an 80-core cable having eighty core-wires and a 40-core cable having forty core-wires, the 40-core or the 80-core cable being connected between a host and a peripheral storage apparatus so as to form an IDE (Integrated Drive electronics) bus defined by an ATA (AT Attachment) abbreviated to an ATA (IDE) bus, the 80-core cable being capable of performing transmission at a data transmitting speed not less than 66 MB/S supported on an ultra DMA (ultra Direct Memory Access) system related to the ATA (IDE) bus, the host being capable of detecting a PDIAG-signal which is used for the ATA (IDE) bus and which is generated by the peripheral storage apparatus, said system comprising:

means for setting a detecting period for detecting a first state of the PDIAG-signal, said detecting period being not shorter than a first time needed to change the PDIAG-signal into said first state; and means for discriminating, by detecting the state of the PDIAG-signal during said detecting period, which of the 40-core cable and the 80-core cable is used, wherein the 40-core cable is discriminated as being used if the state of the PDIAG-signal comprises a first predetermined state and the 80-core cable is discriminated as being used if the state of the PDIAG-signal a second predetermined state, wherein, when master and slave apparatuses as the peripheral storage apparatus are connected to the host, a protocol period is adopted as said detecting period, wherein said protocol period comprises the sum of a first protocol period, a second protocol period and a third protocol period, and wherein said third protocol period comprises a period that the peripheral storage apparatus changes the PDIAG-signal into said first state within the PDIAG-signal has been settled into said first state.

* * * * *